(12) United States Patent
Uehara et al.

(10) Patent No.: US 8,339,504 B2
(45) Date of Patent: Dec. 25, 2012

(54) OPTICAL ELEMENT DRIVE MECHANISM AND IMAGE PICKUP APPARATUS HAVING THE SAME

(75) Inventors: Takumi Uehara, Kawasaki (JP); Kazushige Ichino, Kokubunji (JP); Harushige Yamamoto, Yamato (JP)

(73) Assignee: Canon Kabushiki Kaisha (JP)

( * ) Notice: Subject to any disclaimer, the term of this patent is extended or adjusted under 35 U.S.C. 154(b) by 465 days.

(21) Appl. No.: 12/630,487

(22) Filed: Dec. 3, 2009

(65) Prior Publication Data

US 2010/0141827 A1 Jun. 10, 2010

(30) Foreign Application Priority Data

Dec. 10, 2008 (JP) ................................ 2008-314439

(51) Int. Cl.
*H04N 5/232* (2006.01)
(52) U.S. Cl. ............... 348/345; 348/335; 359/699
(58) Field of Classification Search ............ 348/335, 348/345, 357; 359/694–704, 726, 813, 819, 359/822, 823; 396/72, 73; 348–350
See application file for complete search history.

(56) References Cited

U.S. PATENT DOCUMENTS

| | | | | |
|---|---|---|---|---|
| 7,206,139 B2* | 4/2007 | Bito et al. | ...................... | 359/690 |
| 7,307,797 B2* | 12/2007 | Yoshitsugu et al. | .......... | 359/689 |
| 7,369,333 B2* | 5/2008 | Chigasaki et al. | ............ | 359/819 |
| 7,426,085 B2* | 9/2008 | Yoshitsugu et al. | .......... | 359/819 |
| 7,567,390 B2* | 7/2009 | Yoshitsugu et al. | .......... | 359/683 |
| 7,626,766 B2* | 12/2009 | Yoshitsugu et al. | .......... | 359/683 |
| 7,692,869 B2* | 4/2010 | Yamaguchi et al. | .......... | 359/676 |
| 7,791,801 B2* | 9/2010 | Yoshitsugu et al. | .......... | 359/557 |
| 7,872,820 B2* | 1/2011 | Yamamoto et al. | ........... | 359/822 |
| 7,898,745 B2* | 3/2011 | Matsui et al. | ................. | 359/699 |
| 8,023,197 B2* | 9/2011 | Wada | ............................ | 359/683 |
| 8,035,905 B2* | 10/2011 | Yamamoto et al. | .......... | 359/696 |
| 2006/0045515 A1* | 3/2006 | Seita | ............................ | 396/349 |
| 2006/0098306 A1* | 5/2006 | Yoshitsugu et al. | .......... | 359/819 |
| 2006/0285221 A1* | 12/2006 | Bito et al. | ..................... | 359/676 |
| 2010/0141827 A1* | 6/2010 | Uehara et al. | ................. | 348/345 |
| 2011/0292523 A1* | 12/2011 | Uehara et al. | ................. | 359/699 |
| 2011/0317989 A1* | 12/2011 | Murakami et al. | ............. | 396/72 |
| 2012/0044578 A1* | 2/2012 | Murakami | .................... | 359/694 |
| 2012/0044582 A1* | 2/2012 | Murakami | .................... | 359/704 |

FOREIGN PATENT DOCUMENTS

| | | |
|---|---|---|
| JP | 2006-259685 A | 9/2006 |
| JP | 4-028721 B2 | 12/2007 |

* cited by examiner

*Primary Examiner* — Aung S Moe
(74) *Attorney, Agent, or Firm* — Rossi, Kimms & McDowell LLP

(57) ABSTRACT

An image pickup apparatus including a lens barrel with a bending optical system, in which a reflection optical element is movable between a storage state and a photographing state. When a rotary cylinder that retains a lens group to which light beams from an object are incident is being driven by a drive source to advance and retreat between a storage state and a photographing state, the coupling between a cam mechanism for rotary cylinder operation and a driving force transmission gear train for optical element operation is automatically established and released, whereby the operation for moving the reflection optical element between the storage state and the photographing state can be achieved by a single drive source.

5 Claims, 5 Drawing Sheets

OPTICAL ELEMENT DRIVE MECHANISM AND IMAGE PICKUP APPARATUS HAVING THE SAME

BACKGROUND OF THE INVENTION

1. Field of the Invention

The present invention relates to an optical element drive mechanism suitable for use in an image pickup apparatus with a bending optical system, and relates to an image pickup apparatus having the optical element drive mechanism.

2. Description of the Related Art

An image pickup apparatuses is generally demanded to have a telephoto lens or a zoom lens and have an ability of compactly storing a lens barrel at non-photographing time for ease of handling and transport of the apparatus.

To this end, some image pickup apparatus has a bending optical system including a reflection optical element (e.g., a prism) disposed between object-side and image-side lens groups, the object-side lens group being attached to an expandable and retractable barrel and the image-side lens group being used for forming an image on an image pickup element disposed within an apparatus main body.

Another image pickup apparatus with a bending optical system has been proposed, in which a lens barrel is retracted into an empty space created by moving a reflection optical element to a retract position, whereby the lens barrel is stored inside an apparatus main body (see, Japanese Patent No. 4028721, for example).

The proposed image pickup apparatus includes a lens frame that retains a lens group into which a light flux incoming from an object is incident along a first optical axis. The lens frame is movable along the first optical axis between a use position where the frame is projected from a housing and a storage position where the frame is retracted into the housing. The image pickup apparatus further includes a prism for bending the light flux passing through the lens group from the first optical axis to a second optical axis crossing therewith, thereby projecting the light flux onto an image pickup element. To ensure a space for receiving the lens frame, the prism is retracted along the second optical axis from a position where the prism guides the light flux passing through the lens group to the image pickup element to a retract position where the prism is on the side of the image pickup element.

Still another image pickup apparatus has been proposed that has a reflection optical element configured to be retracted when a camera is in a storage state (see, for example, Japanese Laid-open Patent Publication No. 2006-259685). This image pickup apparatus includes an image pickup optical system, retained by the lens barrel, for forming an optical image of an object. The image pickup optical system includes an object-side lens group to which light beams from the object are incident, and a reflection optical element having a reflection surface for bending light beams output from the object-side lens group. When the camera is in an image pickup state, the object-side lens group is held to be movable in the direction of light beams incident from the object. When the camera is in the storage state, the reflection optical element is retracted to a retract position different from a position disposed when the camera is in the image pickup state.

However, in the image pickup apparatus disclosed in Japanese Patent No. 4028721, the lens group for receiving the light flux incident from the object along the first optical axis is supported by guide shafts. At the time of photographing, the lens group is set at a position where it projects from a camera main body. Due to the support structure for the lens group, it is difficult to project the lens group beyond a certain amount, resulting in a problem that the lens group is not suitable for use in a high-powered zoom optical system.

Japanese Laid-open Patent Publication No. 2006-259685 discloses establishing the storage state of the camera by retreating the reflection optical element to a retreat position different from its position disposed when the camera is in the image pickup state, but fails to disclose a concrete construction for establishing the storage state.

SUMMARY OF THE INVENTION

The present invention provides an optical element drive mechanism of an image pickup apparatus capable of making the image pickup apparatus high-powered and compact at the same time, by increasing an amount of projection of an object lens from a non-photographing position to a photographing position and by simplifying a construction for moving a reflection optical element from a retreat position outside a barrel during non-photographing into an empty space created by an object-side lens being projected, and provides an image pickup apparatus having the optical element drive mechanism.

According to a first aspect of this invention, there is provided an optical element drive mechanism of an image pickup apparatus having a lens group disposed on a first optical axis along which light beams from an object are incident, and an optical element for bending the light beams propagating along the first optical axis to a direction of a second optical axis, the optical element being movable between a storage state and a photographing state, comprising a drive mechanism configured to rotatably drive a rotary cylinder mounted with the lens group, the drive mechanism being operable in conjunction with a drive source, a cam mechanism for rotary cylinder operation configured to operate in conjunction with rotation of the rotary cylinder, the cam mechanism at least moving the rotary cylinder in the direction of the first optical axis to advance and retreat between a storage state and a photographing state and rotating the rotary cylinder about the first optical axis in the photographing state, a driving force transmission gear train having an input-side gear disposed for engagement with a gear portion formed on the rotary cylinder, the driving force transmission gear being configured to have the input-side gear in engagement with the gear portion so as to output a rotational driving force of the rotary cylinder in a case where the rotary cylinder is in the photographing state and configured to release the engagement between the input-side gear and the gear portion so as not to output the rotational driving force in a case where the rotary cylinder is in the storage state, and an optical element moving operation mechanism configured to move the optical element between the storage state and the photographing state in conjunction with the rotational driving force output from the driving force transmission gear train.

According to a second aspect of this invention, there is provided an image pickup apparatus comprising the optical element drive mechanism according to the first aspect of this invention.

With this invention, it is possible to realize an optical element drive mechanism, which is large in an amount of projection of an object lens from a non-photographing position to a photographing position and which is simple in the construction for moving a reflection optical element, which is retreated outside a barrel at the time of non-photographing, into an empty space created by an object-side lens being projected. As a result, it is possible to realize an optical element drive mechanism and an image pickup apparatus, which are capable of making the image pickup apparatus high-powered and compact at the same time.

In particular, by selecting a region of the rotary cylinder in which the gear portion is formed, it is possible to drive the object lens and the reflection optical system by the same actuator in desired timings independently of each other.

Further features of the present invention will become apparent from the following description of an exemplary embodiment with reference to the attached drawings.

DETAILED DESCRIPTION OF THE PREFERRED EMBODIMENT

The present invention will now be described in detail below with reference to the drawings showing a preferred embodiment thereof.

Figure 1:
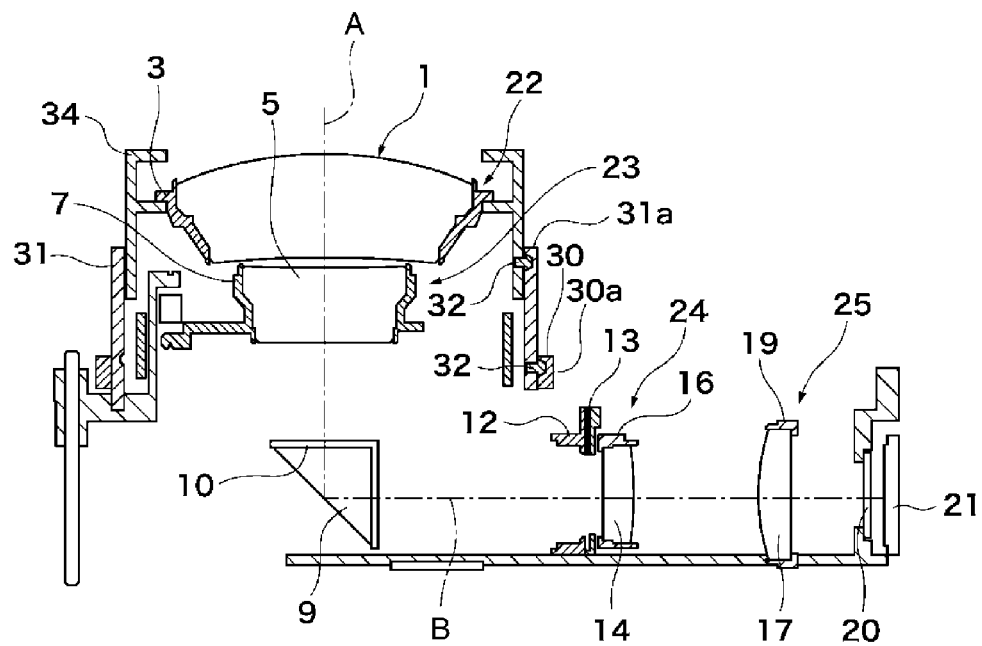
FIG. 1 is a section view schematically showing a barrel of an image pickup apparatus according to one embodiment of this invention in a photographing state.
Figure 2:
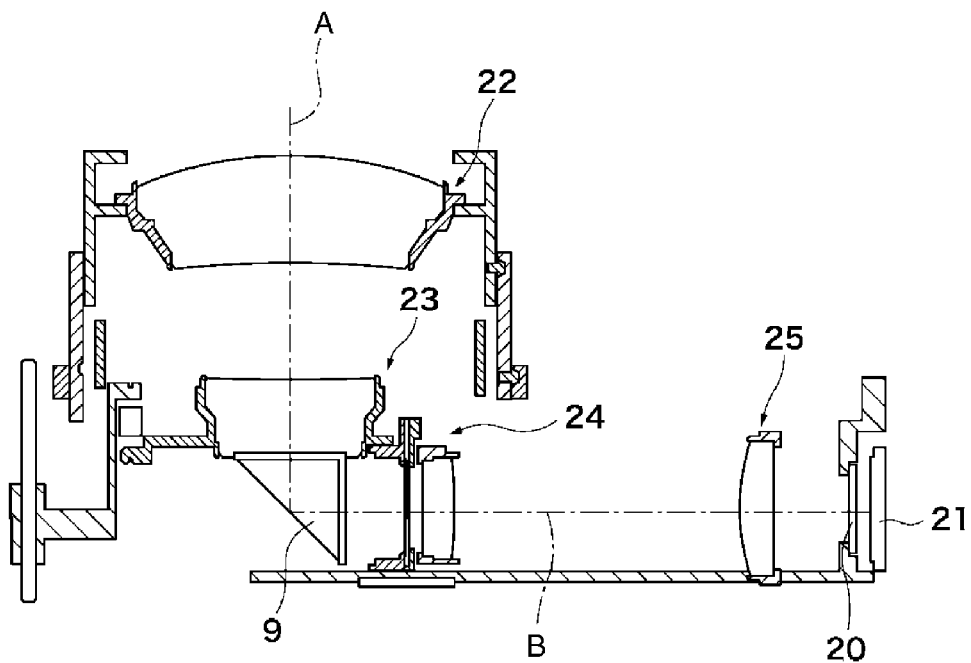
FIG. 2 is a section view schematically showing the barrel in a TELE state where a photography lens system is at a long focal length.
Figure 3:
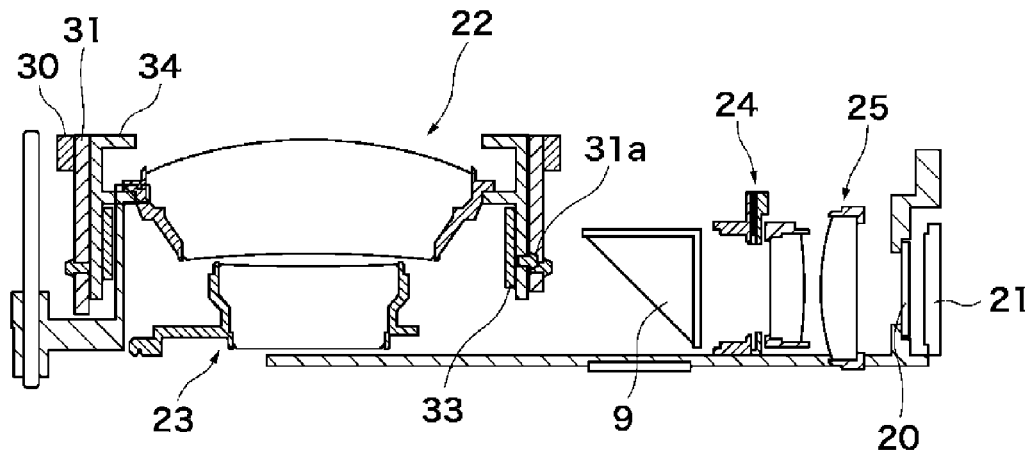
FIG. 3 is a section view schematically showing the barrel in a taking-lens storage state.

FIGS. 1 to 3 schematically show in cross section a barrel of an image pickup apparatus according to one embodiment of this invention in a photographing state, in a TELE state where a photography lens system is at a long focal length, and in a taking-lens storage state, respectively.

As shown in FIGS. 1 to 3, the barrel of the image pickup apparatus includes a bending optical system that has first to fourth lens groups 22 to 25.

The first lens group 22 includes a first group lens 1 retained by a first group lens holder 3.

The second lens group 23 includes a second group lens 5 built into a second group lens holder 7. The second lens group 23 is driven for a zooming operation by a drive source (e.g., a stepping motor), not shown, to advance and retreat in a direction of an optical axis A along which light beams from an object are incident.

The bending optical system includes a prism 9 as a reflection optical element having a function of bending the photographing optical axis A by 90 degrees toward a second optical axis B. The prism 9 is held by a prism holding member (prism holder) 10 and movable to advance and retreat along the optical axis B in unison with the prism holding member 10.

The bending optical system includes a shutter 13 for controlling an amount of photographing light and a third group lens 14, which are disposed on the optical path at locations rearward of the prism 9 (on the side of an image pickup element 21). The shutter 13 is slidably received between front and rear shutter base plates 12, 16, which are fixed to each other by fixing means, e.g., screws.

The third group lens 14 is retained by the rear shutter base plate 16, thereby constituting a third lens group 24 for a taking lens. The third lens group 24 is configured to advance and retract along the optical axis B for a zooming operation.

The bending optical system includes a fourth lens group 25 disposed on the optical path at a location rearward of the third lens group 24 (on the side of the image pickup element 21). The fourth lens group 25 is formed by a fourth group lens 17 held by a fourth group lens holder 19. The fourth lens group 25 is driven for zooming and in-focusing operations by a drive source (e.g., a stepping motor), not shown, to advance and retreat in the direction of the optical axis B.

The image pickup element 21 is disposed at the end of the optical path located rearward of the fourth lens group 25. An optical filter having a lowpass filter function for cutting light having a high spatial frequency or a function for cutting infrared light is disposed in front of the image pickup element 21.

By constructing the bending optical system as described above, a photography optical system is completed. With this optical system, an object image is formed on the image pickup element 21 and a picked-up image is converted into an electrical signal, thereby obtaining an electrophotograph. It should be noted that in the bending optical system, the prism 9 is used as a reflection optical element for bending a light flux, but other element (e.g., a mirror) can be used. The reflection optical element can be disposed between, e.g., the first and second lens groups 22, 23.

When the photography optical system is set to the photographing state shown in FIG. 1, the photography lens system is set to a WIDE position for wide-angle photography.

When the photography optical system is set to the TELE state shown in FIG. 2, the photographing can be made in a TELE state where the photography lens system is at a long focal length.

In the TELE state, the first lens group 22 is kept fixed at the WIDE position. The second lens group 23 is driven by, e.g., a step motor (not shown) to retreat along the optical axis A and set at a predetermined position near the prism 9. As with the second lens group 23, the third lens group 24 is driven by, e.g., a stepping motor (not shown) along the optical axis B and set at a predetermined position near the prism 9. The fourth lens group 25 is driven by, e.g., a stepping motor along the optical axis B and set at a predetermined position near the image pickup element 21.

When the image pickup apparatus is not in use, the photography optical system is set to the taking-lens storage state shown in FIG. 3.

In the taking-lens storage state, the prism 9 is driven along the optical axis B to a retreat position where the prism 9 is disposed away from the photographing optical axis A, and the first and second lens groups 22, 23 are driven along the optical axis A to their storage positions. The prism 9 at the retreat position does not interfere with the third and fourth lens groups 24, 25.

Next, with reference to FIGS. 4 and 5A to 5C, a drive mechanism for first lens group and a prism retraction mechanism (optical element moving operation mechanism) will be described.

Figure 4:
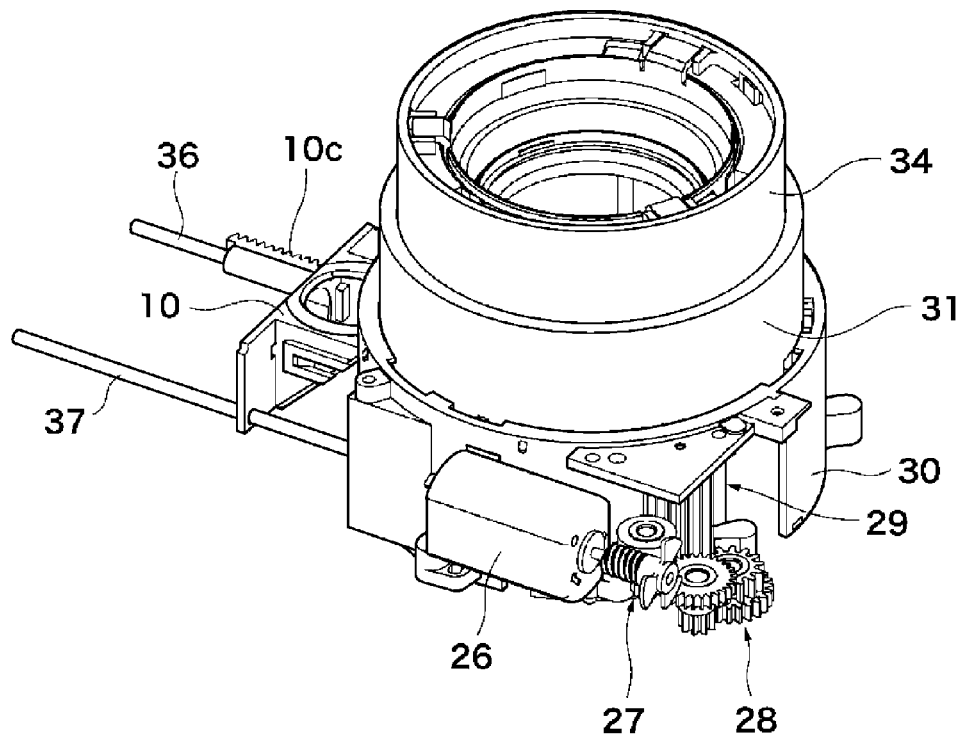
FIG. 4 is a section view schematically showing the barrel in a storage state.
Figure 5A:
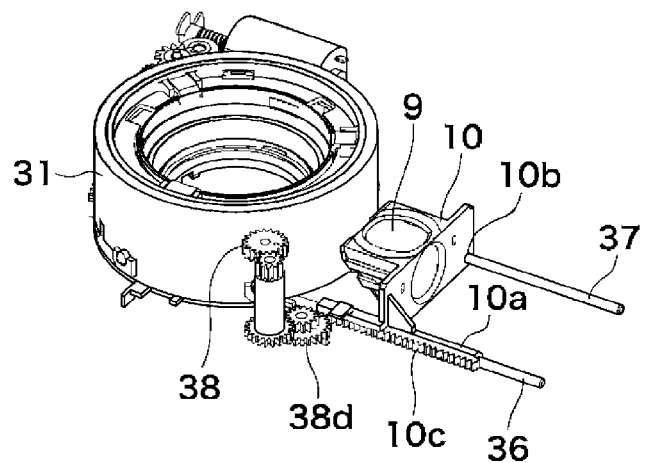
FIG. 5A is a perspective view showing an interlocking mechanism between a differential cylinder and a prism of the barrel in a state where a first lens group and the prism are stored.
Figure 5B:
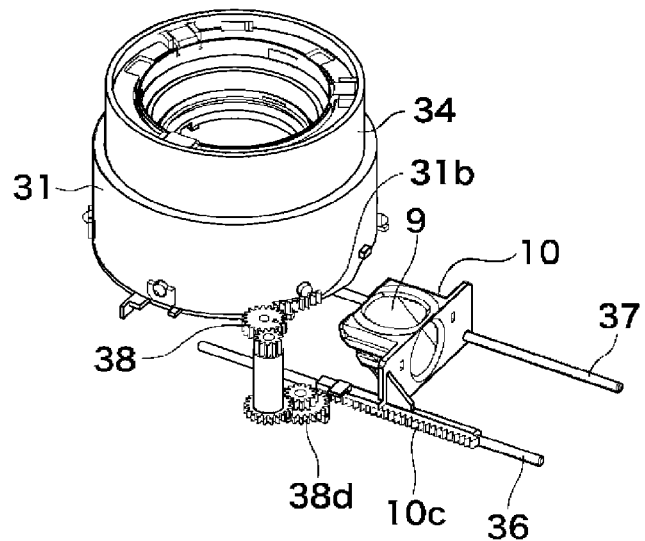
FIG. 5B is a perspective view showing the interlocking mechanism in a state observed immediately after the first lens group is projected.
Figure 5C:
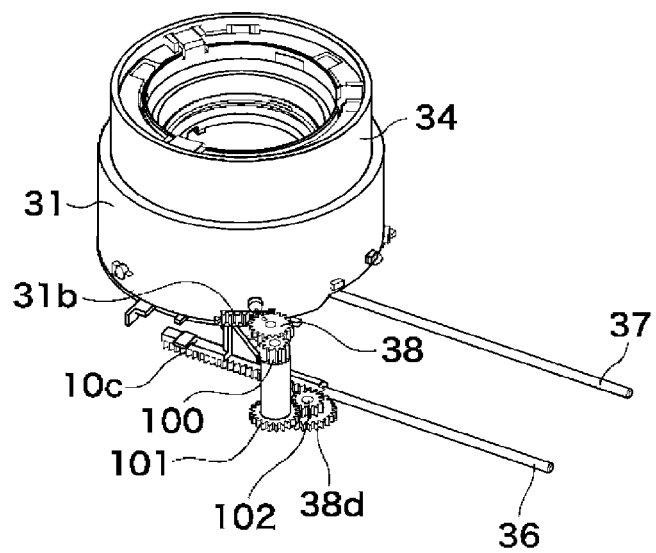
FIG. 5C is a perspective view showing the interlocking mechanism in a state where the prism is moved to a photographing position.

FIG. 4 schematically shows in perspective view a storage state (corresponding to FIG. 3) of the first lens group 22 and the prism 9 in the barrel. FIGS. 5A to 5C show in perspective view an interlocking mechanism between the prism 9 and a differential cylinder of the barrel in a state (corresponding to FIG. 3) where the first lens group 22 and the prism 9 are stored, in a state observed immediately after the first lens group 22 is projected, and in a state (corresponding to FIG. 1 or 2) where the prism 9 is moved to a photographing position, respectively.

The drive mechanism for first lens group and the prism retraction mechanism are configured to use a single motor 26 to drive a differential cylinder 31 related to the drive mechanism for the first lens group 22 or drive the prism retraction mechanism via the differential cylinder 31. Specifically, as shown in FIG. 4, a rotational driving force of the motor 26 is transmitted to the differential cylinder 31 via a worm gear 27, a speed reducing gear train 28, and a drive gear 29. The differential cylinder 31, when rotatably driven, rotates a predetermined angle in the storage state through the action of a cam mechanism for rotary cylinder operation (shown in FIG. 6), and projects in the direction of optical axis A, while rotating, to reach a photographing standby state. Next, the differential cylinder 31 rotates a predetermined angle in the photographing standby state, and then stops rotating.

In a final state of the above operation to set the differential cylinder 31 to the photographing standby state, a gear portion 31b of the differential cylinder 31 is brought in mesh with an input-side gear 38 of the prism retraction mechanism to enable transmission of rotational driving force.

As a result, the rotational driving force of the motor 26 is input to the input-side gear 38 of the prism retraction mechanism from the gear portion 31b of the differential cylinder 31, and is transmitted from a prism drive gear 38d on the output side of the gear train of the prism retraction mechanism to a rack portion 10c of the prism holding member 10.

By the rotational driving force of the motor 26, the prism holding member 10 having the prism 9 is shifted from the storage state to the photographing standby state.

To shift the prism holding member 10 from the photographing standby state to the storage state, reverse operations opposite to the above operations are performed. It should be noted that before start of the differential cylinder 31 being moved from the photographing standby state to the storage state, the engagement between the gear portion 31b of the differential cylinder 31 and the input-side gear 38 of the prism retraction mechanism is released.

Next, respective parts of the image pickup apparatus of this embodiment will be described in sequence. As shown in FIG. 4, the drive mechanism for the first lens group 22 is configured to include, as a drive source thereof, the motor 26 of the ordinary type. The motor 26 has an output shaft to which the worm gear 27 is press-fitted and attached. A speed reducing gear train 28 is connected to the worm gear 27. The gear train 28 has the final stage drive gear 29, which is rotatably attached to the fixed cylinder 30.

The fixed cylinder 30 has an inner periphery formed with cam grooves 30a, described later. Cam pins 32 (shown in FIG. 6) fixed to or integrally formed with the differential cylinder 31 (rotary cylinder) are slidably engaged with the cam grooves 30a, thereby constituting a cam mechanism for rotary cylinder operation for rotating the differential cylinder 31.

The differential cylinder 31 is formed with a gear (not shown) which is in engagement with the drive gear 29 whose rotational driving force is transmitted to the differential cylinder 31 to rotatably drive the same. At that time, the differential cylinder 31 is moved to advance and retreat along the optical axis A by the action of the cam groove (the cam mechanism for rotary cylinder operation).

A rectilinear guide cylinder 33 is attached to the inner periphery of the differential cylinder 31 so as to be rotatable relative to the differential cylinder 31 and movable along the optical axis A in unison with the cylinder 31. Cam grooves 31a (shown in FIGS. 1 and 3) are formed on the inner periphery of the differential cylinder 31.

A first group barrel 34 retaining the first lens group 22 is held between the inner periphery of the differential cylinder 31 and an outer periphery of the rectilinear guide cylinder 33. Cam pins 32 (shown in FIG. 1) fixed to or integrally formed with the first group barrel 34 are slidably engaged with the cam grooves 31a formed in the differential cylinder 31.

A convex portion (not shown) is formed on the outer periphery of the rectilinear guide cylinder 33 and is in slidable engagement with an engagement groove formed in an inner periphery of the first group barrel 34, whereby a rotational motion of the first group barrel 34 is restricted.

In the drive mechanism for first lens group, with the rotation of the differential cylinder 31 by the driving force of the motor 26, the first group barrel 34 is moved to advance and retreat relative to the differential cylinder 31 in the direction of the optical axis A by the engagement between the cam grooves formed in the inner periphery of the differential cylinder 31 and the cam pins 32 of the first group barrel 34 and by the engagement between the convex portion of the rectilinear guide cylinder 33 and the engagement groove formed in the inner periphery of the first group barrel 34. The first group barrel 34 moved to advance and retreat relative to the differential cylinder 31 drives the first group lens between the storage position and the photographing position.

Next, a prism retraction mechanism (optical element moving operation mechanism) is described with reference to FIGS. 5A to 5C.

The prism retraction mechanism includes two guide shafts 36, 37 and includes an engagement portion 10a and a steady rest 10b of the prism holding member 10 which are in engagement with the guide shafts 36, 37 so as to be slidable relative thereto in the direction of the optical axis B.

The engagement portion 10a of the prism holding member 10 is formed into an elongated tube. A rack portion 10c is provided near the engagement portion 10a.

The rack portion 10c is in engagement with the prism drive gear 38d (the output-side gear in the driving force transmission gear train) to cause the prism holding member 10 to advance and retreat along the optical axis B as previously described. The driving force transmission gear train includes intermediate gears 100, 101, 102 as well as the prism drive gear 38d and the input-side gear 38.

The prism retraction mechanism is configured to establish or release the engagement between the input-side gear 38 of the driving force transmission gear train and the gear portion 31b formed on the outer periphery of the differential cylinder 31. The gear portion 31b is formed at such a position that the gear portion 31b is able to be brought in mesh with the input-side gear 38 only when the differential cylinder 31 is in a projected state.

With the prism retraction mechanism constructed as above, when the differential cylinder 31 is being moved to advance or retreat in the direction of the optical axis A, the engagement between the gear portion 31b of the differential cylinder 31 and the input-side gear 38 of the driving force transmission gear train is released. Therefore, while the first group barrel 34 is being projected by the driving force of the motor 26 along the optical axis A toward the photographing standby position, the driving force is not transmitted from the gear portion 31b of the differential cylinder 31 to the input-side gear 38 of the driving force transmission gear train. As a result, the prism 9 is not moved from the storage position while the first group barrel 34 is being projected along the optical axis A toward the photographing standby position.

After the first group barrel 34 is set to the photographing position, the gear portion 31b of the differential cylinder 31 is brought in mesh with the input-side gear 38 of the driving force transmission gear train, and the prism 9 is set to the photographing position by the rotation of the differential cylinder 31.

Next, with reference to FIG. 6, a description will be given of a part of the prism retraction mechanism for changing the positions of the differential cylinder 31 and the first group barrel 34 relative to the fixed cylinder 30 in relation to the operation to move the prism 9 between the storage position and the photographing standby position.

Figure 6:
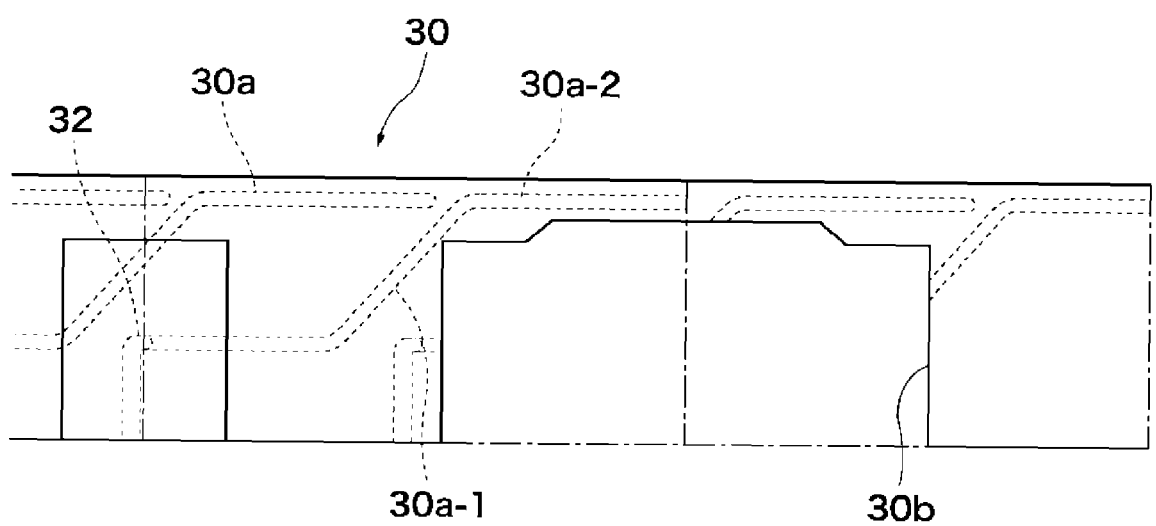
FIG. 6 is a development view showing a planarly developed outer surface of a fixed cylinder of the barrel at a part having a notched opening that permits the prism to pass therethrough.

FIG. 6 shows in planarly developed view an outer surface of the fixed cylinder 30 at a part having a notched opening 30b that permits the prism 9 to pass therethrough.

As previously described, the fixed cylinder 30 is formed with the cam grooves 30a with which the cam pins 32 fixed to or integrally formed on the differential cylinder 31 are slidably engaged. In FIG. 6, one of the cam pins is denoted at 32 in a state that the differential cylinder 31 is at the storage position.

With rotation of the motor 26 to shift the first lens group 22 in the barrel from the storage state to the photographing standby state, the cam pins 32 are driven along the cam grooves 30a to the right in FIG. 6, and the first lens group 22 is projected in the direction of the optical axis A to follow the movement of each cam pin 32 in a lift zone 30a-1 of the cam groove 30a in FIG. 6.

When the cam pins 32 are each moved up to a zone 30a-2 of the cam groove 30a corresponding to the photographing position, the first lens group 22 is kept stopped at a corresponding position, while the differential cylinder 31 is kept rotating.

When the cam pins 32 are each in the zone 30a-2, the gear portion 31b formed on a rear part of the outer periphery of the differential cylinder 31 (shown in FIGS. 5A and 5B) is in mesh with the input-side gear 38 of the driving force transmission gear train, whereby the rotational driving force is transmitted from the differential cylinder 31 to the driving force transmission gear train.

Then, the rotational driving force is transmitted from the driving force transmission gear train (input-side gear 38, intermediate gears 100, 101, 102, and prism drive gear 38d) to the rack portion 10c of the prism holding member 10, whereby the prism holding member 10 is driven to the photographing standby position.

When the first lens group 22 is returned from the photographing state to the storage state, reverse operations opposite to the above operations are performed. The first lens group 22 is stored into the camera main body after the prism 9 is retreated from the fixed cylinder 30. It should be noted that both the first and second lens groups 22, 23 can be moved between photographing state and storage state.

In the embodiment, the construction has been described in which the movement of the prism holding member toward the photographing position is started after the first lens group 22 is projected to the photographing position. Alternatively, it can be configured to start the movement of the prism 9 when the first lens group is projected at least to a position where the prism 9 and the first lens group 22 do not interfere with each other.

In the embodiment, the construction has been described in which the first lens group 22 is not moved, while the zooming operation from WIDE (wide angle) to TELE (telephoto) is being performed. However, it can be configured to move the first lens group 22 in conjunction with the zooming operation. In that case, the fixed cylinder 30 is formed with cam grooves each of which is extended to have a zooming zone such that the differential cylinder 31 is rotated in conjunction with zooming operation. The differential cylinder 31 can be configured not to have the gear portion 31b in the zooming zone, so that the gear portion 31b and the prism drive gear 38d are not engaged with each other in the zooming zone to thereby prevent an undesired movement of the prism 9.

Next, with reference to FIGS. 7 and 8, a description will be given of the construction of the prism retraction mechanism at a part where engagement between the gear portion 31b of the differential cylinder 31 and the input-side gear 38 of the driving force transmission gear train is established and released.

Figure 7:
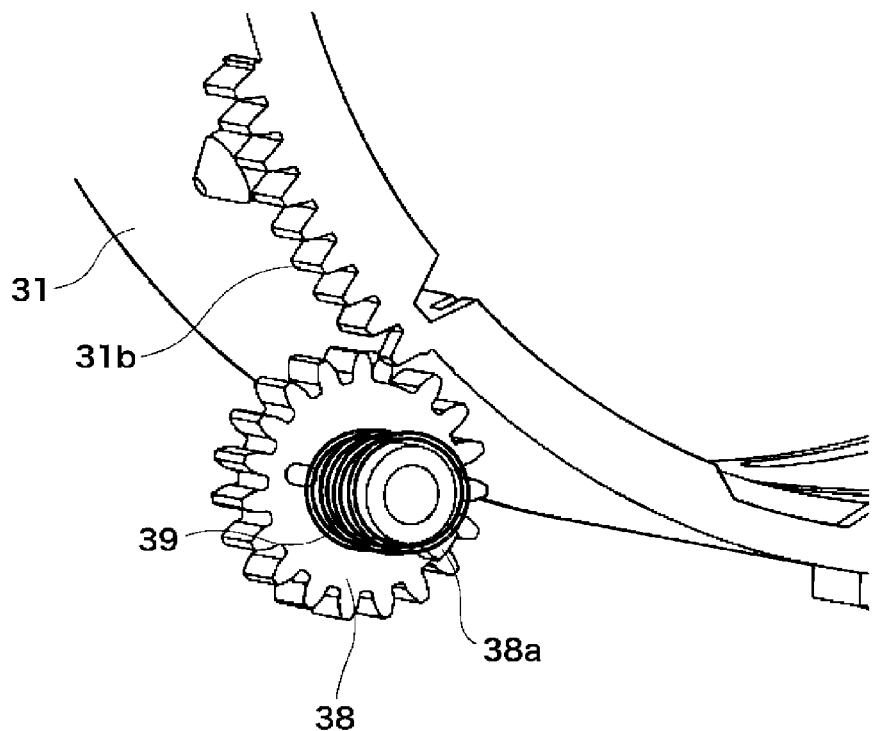
FIG. 7 is a fragmentary enlarged perspective view showing a prism retraction mechanism of the barrel at a part where a gear of a differential cylinder and a prism drive gear are in mesh and out of mesh with each other.

FIG. 7 shows in fragmentary enlarged perspective view the part of the prism retraction mechanism where the engagement between the gear portion 31b and the gear 38 is established and released.

Figure 8:
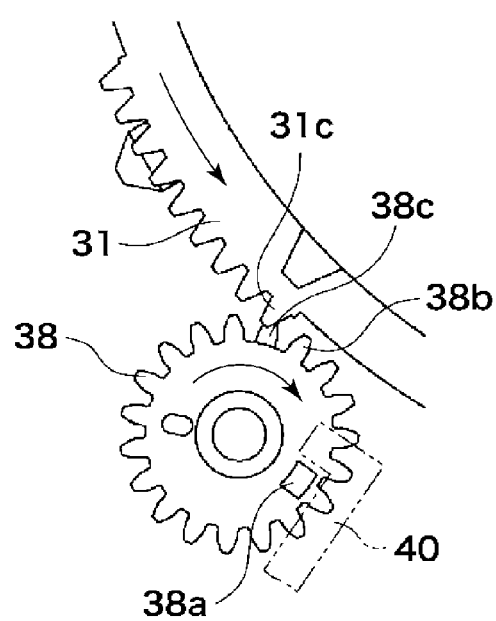
FIG. 8 is a fragmentary enlarged rear view showing the prism retraction mechanism at a part where the gear of the differential cylinder and the prism drive gear are about to be meshed with each other.

FIG. 8 shows in fragmentary enlarged perspective view a part of the prism retraction mechanism where the gear portion 31b and the gear 38 are about to be meshed with each other.

An urging member (e.g., a torsion spring 39) for urging the input-side gear 38 to rotate in one direction along which the prism 9 is retreated is attached to the input-side gear 38. A rectangular stopper portion 38a is formed in a predetermined position on a side surface of the input-side gear 38.

A restraint member 40 is formed on a gear base (not shown) so as to be in contact with the stopper portion 38a of the input-side gear 38 in a state where the prism 9 is retreated up to the storage position. Due to an urging force of the torsion spring 39, the stopper portion 38a of the input-side gear 38 is brought in press contact with the restraint member 40, whereby the input-side gear 38 is accurately positioned and held at a predetermined rotation phase position.

With the prism retraction mechanism constructed as above, the input-side gear 38 of the driving force transmission gear train is held at a phase corresponding to the retreat position of the prism 9 when the gear portion 31b of the differential cylinder 31 and the input-side gear 38 of the driving force transmission gear train are in a state where the engagement therebetween is released.

The gear portion 31b of the differential cylinder 31 and the input-side gear 38 of the driving force transmission gear train are formed into shapes such that the gear portion 31b and the input-side gear 38 are not in contact at their tooth tips with each other when they are brought into mesh with each other.

To this end, the gear portion 31b of the differential cylinder 31 has a tooth 31c to be initially in mesh with the input-side gear 38 of the driving force transmission gear train, the tooth 31c being formed to have a length in face width direction equal to about half of the entire face width of the gear 38 by removing a part from the center of the tooth 31c to one end thereof in the face width direction.

The input-side gear 38 has a tooth 38b to be initially in mesh with the gear portion 31b of the differential cylinder 31, and a tooth 38c to be secondly in mesh therewith and located adjacent to the tooth 38b. The tooth 38c is formed to have a length in face width direction equal to about half of the entire face width of the gear 38 by removing a part from the center of the tooth 38c to another end thereof in the face width direction.

Thus, the tooth 31c of the gear portion 31b of the differential cylinder 31, which is adapted to initially be engaged with the gear 38, and the tooth 38c of the input-side gear 38, which is adapted to secondly be engaged with the gear portion 31b, are alternately notched in the face width direction, so that the teeth 31c, 38c are not in mesh with each other.

With the above construction, when the differential cylinder 31 starts rotating in a direction shown by arrow in a state that the gear portion 31b of the differential cylinder 31 and the input-side gear 38 are coincident in rotation phase, the tooth 31c of the gear portion 31b and the tooth 38c the input-side gear 38 are not in mesh with each other and the gear 38 does not rotate. Then, the tooth 31c of the gear portion 31b of the differential cylinder 31 is brought in contact with the tooth 38b of the input-side gear 38, and the gear portion 31b and the gear 38 start to be engaged with each other. As a result, the gear 38 starts rotating in a direction shown by arrow.

As shown in FIG. 8, the tooth 38b of the input-side gear 38 is located close to the differential cylinder 31 than the notched tooth 38c, and therefore the tooth 38b is brought in contact with the tooth 31 of the gear portion 31b at a tooth surface position closer to the tooth root than to the tooth tip. As a result, there is no fear that the gear portion 31b of the differential cylinder 31 and the input-side gear 38 are brought in contact at their tooth tips with each other when they start to be engaged together, whereby they can smoothly be engaged.

For comparison purpose, a case is described below where the tooth 31c of the gear portion 31b of the differential cylinder 31 and the tooth 38c of the input-side gear 38 of the driving force transmission gear train are each normally formed to have a length in face width direction equal to the entire face width of the gear.

In that case, after the gear portion 31b of the differential cylinder 31 is moved close to the input-side gear 38 of the driving force transmission gear train, the gear portion 31b and the input-side gear 38 are initially in mesh at the teeth 31c, 38c with each other. Since the gear portion 31b and the gear 38 are brought in contact at tooth surface positions close to the tooth tips, there is a fear that the tooth tips interfere (contact) with each other and the gear portion 31b and the gear 38 cannot smoothly be engaged. On the other hand, according to the above described embodiment, the tooth tips are prevented from interfering (contacting) with each other.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2008-314439, filed Dec. 10, 2008, which is hereby incorporated by reference herein in its entirety.

What is claimed is:

1. An optical element drive mechanism of an image pickup apparatus having a lens disposed on a first optical axis along which light beams from an object are incident, and an optical element for bending the light beams propagating along the first optical axis to a direction of a second optical axis, the optical element being movable between a storage state and a photographing state, the optical element drive mechanism comprising:
a drive mechanism configured to rotatably drive a rotary cylinder mounted with the lens, said drive mechanism being operable in conjunction with a drive source;
a driving force transmission gear train having an input-side gear disposed for engagement with a gear portion formed on the rotary cylinder, said driving force transmission gear train being configured to have the input-side gear in engagement with the gear portion so as to output a rotational driving force of the rotary cylinder in a case where the rotary cylinder is in the photographing state and configured to release the engagement between the input-side gear and the gear portion so as not to output the rotational driving force in a case where the rotary cylinder is in the storage state; and
an optical element moving operation mechanism configured to move the optical element between the storage state and the photographing state in conjunction with the rotational driving force output from said driving force transmission gear train.

2. The optical element drive mechanism according to claim 1, wherein the gear portion of the rotary cylinder has one end thereof formed with a tooth adapted to be initially in mesh with the input-side gear, and the input-side gear of said driving force transmission gear train has a tooth adapted to be secondly in mesh with the gear portion, these teeth being alternately notched in a face width direction so as not to be in mesh with each other.

3. The optical element drive mechanism according to claim 1, wherein engagement between the input-side gear of said driving force transmission gear train and the gear portion of the rotary cylinder is released before start of the rotary cylinder being shifted from the photographing state to the storage state.

4. The optical element drive mechanism according to claim 2, further including:
a stopper portion formed on the input-side gear of said driving force transmission gear train;
a restraint member configured to lock said stopper portion in a state that the tooth of the gear portion adapted to be initially in mesh with the input-side gear and the tooth of the input-side gear adapted to be secondly in mesh with the gear portion are coincident in rotation phase with each other; and
an urging member attached to the input-side gear, said urging member being configured to urge the input-side gear to rotate in one direction so as to enable said restraint member to lock said stopper portion.

5. An image pickup apparatus comprising:
a lens disposed on a first optical axis along which light beams from an object are incident;
an optical element for bending the light beams propagating along the first optical axis to a direction of a second optical axis, the optical element being movable between a storage state and a photographing state;
an image pickup element configured to convert the light beams into an electrical signal; and
an optical element drive mechanism comprising:
a drive mechanism configured to rotatably drive a rotary cylinder mounted with the lens, said drive mechanism being operable in conjunction with a drive source;
a driving force transmission gear train having an input-side gear disposed for engagement with a gear portion formed on the rotary cylinder, said driving force transmission gear train being configured to have the input-side gear in engagement with the gear portion so as to output a rotational driving force of the rotary cylinder in a case where the rotary cylinder is in the photographing state and configured to release the engagement between the input-side gear and the gear portion so as not to output the rotational driving force in a case where the rotary cylinder is in the storage state; and an optical element moving operation mechanism configured to move the optical element between the storage state and the photographing state in conjunction with the rotational driving force output from said driving force transmission gear train.

\* \* \* \* \*